3,260,610
METHOD OF RECLAIMING WASTE ASPHALTIC MATERIAL
Steven G. Belak, Claymont, Del., assignor to Sun Oil Company, Philadelphia, Pa., a corporation of New Jersey
No Drawing. Filed Mar. 19, 1963, Ser. No. 266,197
1 Claim. (Cl. 106—283)

This invention relates to a process for recovering waste material containing an asphaltic saturant.

In the manufacture of roofing and siding materials a large amount of waste material is produced. This material consists of cut out tabs, edge trimmings, torn pieces and other rejects. The material generally has a thickness of about ⅛ of an inch and consists of one or more plies of felted paper or other cellulosic fibers saturated with tar, asphalt or other bituminous coating and it is usually covered with a layer of mineral material imbedded in asphalt. The mineral material may be a rock dust or discrete granules. Methods of preparing these materials are disclosed in Asphalts and Allied Substances, Abraham, April 1962, vol. 3, pp. 231–302.

A number of proposals have been set forth relating to methods of reclaiming these waste materials. These call for multistep treatments and the use of various materials and chemicals to render the waste suitable for processing, particularly to prevent sticking and clumping.

I have found that waste asphalt products from the manufacture of roll roofing, asphalt shingles, asphalt siding and the like can be reformed into molding compositions and molded articles by violent agitation at ambient temperature employing water as the sole treating agent. This is contrary to the teachings of the prior art which indicate that heat or some additional material like a mineral filler or a surface active agent like soap must be used to prevent sticking and clumping.

In treating the scrap, I employ an impeller-mixer operating at a speed of at least 200 r.p.m. under load conditions. The impellers can be propellers, turbines or paddles; a propeller with shearing action is preferred. The mixing tank can be baffled or unbaffled, vertical or horizontal, flat bottom or dish bottom. One skilled in the art can select a mixer, tank and mixing conditions in accordance with standard engineering practice. General mixing practice and equipment are disclosed in Chemical Process Machinery, 2nd ed., Riegel, 1953, pp. 264–307.

The scraps are simply loaded into the mixing tank together with from 40 to 60 wt. percent water (based on the total mixture) and the mass violently agitated at 200–20,000 r.p.m. No heating is required and ambient temperatures i.e. 40–120° F. are employed.

As an example of the process of the invention, a one-quart Waring Blendor having a no-load speed of about 16,000 r.p.m. was loaded with 500 grams of finger shaped roofing cut outs and an equal weight of water. The mass was agitated for 30 minutes. Mixing was stopped and the excess water drained off. The wet pulverized mass was oven dried at about 125° F. for 18 hours. The dried product is in the form of granules and they are not tacky at ambient temperature. The dried product was molded in a Carver Press at 1500 p.s.i.g. and 125° F. for 15 minutes. The resultant product was a hard, semi-flexible board, well bound and free of tack. It is notable that no additional binder was used or needed in molding the product of the process.

Applicant's single stage reduction of scrap asphalt products employing water alone as the contact agent is believed to be a significant advance over processes requiring additives since the product is uncontaminated with materials which must be removed or which degrade the properties of molded products if they are not removed.

I claim:

A process for preparing a molding composition from waste material obtained from the manufacture of asphalt products comprising cellulosic fibers saturated with a bituminous binder consisting of the steps of violently agitating a mixture consisting of said waste material and from 40 to 60 wt. percent water based on the total mixture, with an impeller mixer at 200–20,000 r.p.m. at a temperature in the range of 40° F–120° F. for a period of from 10 minutes to 10 hours whereby the waste material is reduced to a moist pulverized mass, drying the mass and recovering the resulting molding composition.

References Cited by the Examiner
UNITED STATES PATENTS

| | | | |
|---|---|---|---|
| 1,290,954 | 1/1919 | Ford | 106—282 |
| 1,831,779 | 11/1931 | MacDonald | 264—37 |
| 2,023,675 | 12/1935 | Fisher | 106—282 |
| 2,368,371 | 1/1945 | Minge et al. | 106—282 |

OTHER REFERENCES

Abraham: Asphalts and Allied Substances, 5th edition, vol. 1, D. Van Nostrand Company, Inc., New York (pages 611–622 and particularly page 615).

ALEXANDER H. BRODMERKEL, *Primary Examiner.*
J. B. EVANS, *Assistant Examiner.*